United States Patent Office 3,010,312
Patented Nov. 28, 1961

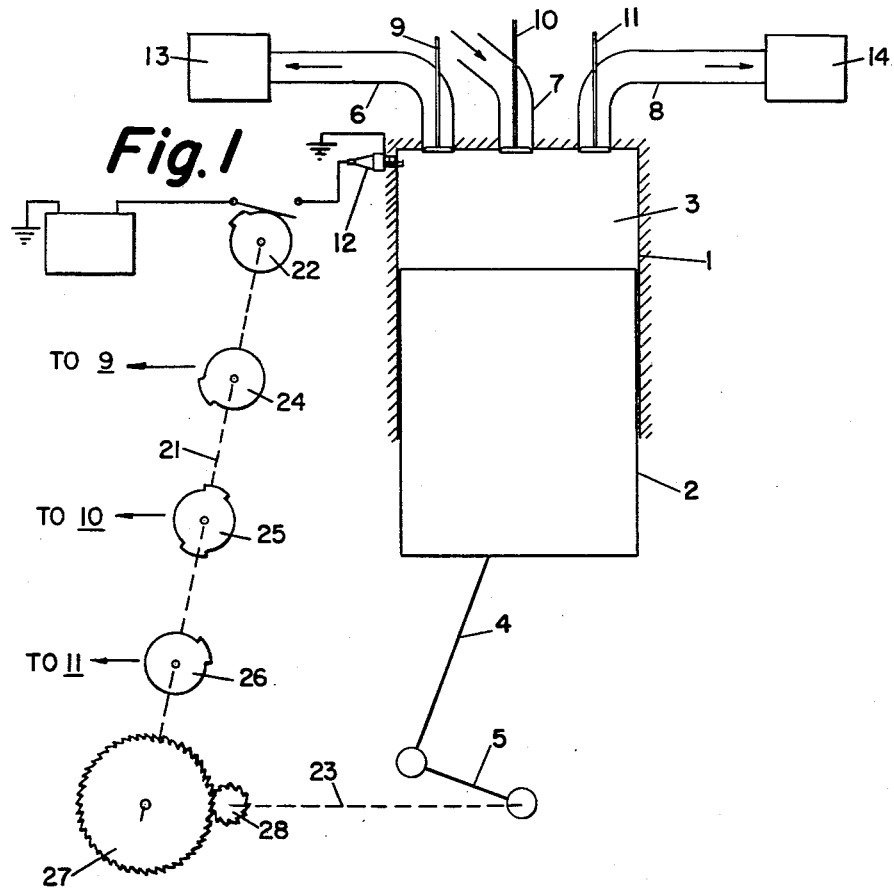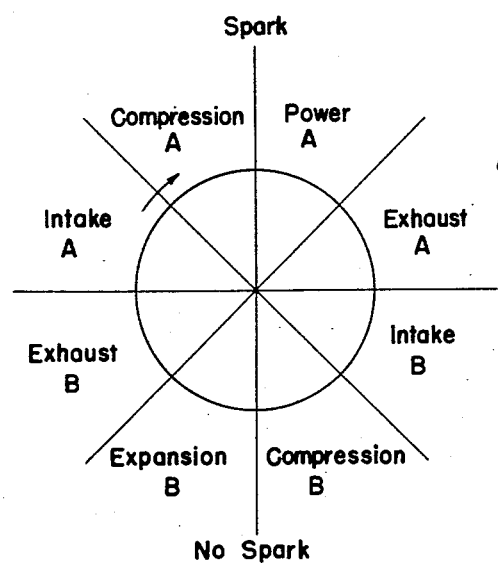

3,010,312
INTERNAL COMBUSTION TEST AND
REACTOR ENGINE
James L. Jezl, Swarthmore, Pa., assignor to Sun Oil Company, Philadelphia, Pa., a corporation of New Jersey
Filed May 18, 1956, Ser. No. 585,679
1 Claim. (Cl. 73—116)

This invention relates to an internal combustion engine adapted to function as a test engine or for the production of power or of recoverable partial oxidation products, and to internal combustion processes for studying the chemical reactions which occur in the fuel mixture prior to ignition thereof or for producing and recovering partial oxidation products obtained by such reactions.

According to one embodiment of the invention, novel apparatus is provided for studying the chemical reactions occurring prior to the spark in the compression stroke of an internal combustion engine. It is generally recognized today that important factors in the performance of the automotive engine are the chemical reactions which take place in the combustion chamber during the compression stroke prior to ignition of the fuel mixture by the spark plug. These reactions may result in an undesirable phenomenon known as "preignition," which is believed to be a commencement of combustion of the fuel mixture prior to the spark. The nature and causes of the preignition phenomenon have recently been the subject of considerable investigation and conjecture, and it is believed that if they can be elucidated, it will be possible to improve the performance of automotive engines.

According to this embodiment of the invention, the products of the chemical reactions occurring in the compression stroke prior to ignition are recovered from the engine in order that they can be analyzed to determine the chemical nature of the products of the reactions. Also, according to this embodiment, the conditions prevailing in the combustion chamber of the engine are maintained generally similar to the conditions prevailing in ordinary operation of an internal combustion engine.

In another embodiment of the invention, novel apparatus is provided which constitute improvements over prior apparatus and methods for producing partial oxidation products from hydrocarbons by operation of an internal combustion engine. Such apparatus and methods are well known in the art, as exemplified by Patent No. 1,939,018 issued December 12, 1933, to William W. Odell. A considerable variety of partial oxidation products obtained from hydrocarbons in such manner are disclosed in the prior art, among them formaldehyde, methyl alcohol, phenol, acetaldehyde, formic acid, acetone, dimethyl ether, hydrogen peroxide, etc. Oxidation products from other types of materials such as hydrogen sulfide are also disclosed in the art as obtainable by operation of an internal combustion engine; thus Patent No. 2,258,305 issued October 7, 1941, to Eugene D. Stirlen discloses production of sulfur from hydrogen sulfide by such operation.

The prior art methods of obtaining partial oxidation products by internal combustion engine operation have the disadvantage that it is difficult to control the reactions which occur after ignition of the combustible material in the combustion chamber. The present invention provides apparatus wherein the recoverable partial oxidation products are produced at least in part in cycles wherein ignition does not occur, oxidation beyond that necessary to produce the desired oxidation products thus being avoided.

The invention will be further described with reference to the attached drawing, wherein FIGURE 1 is a schematic diagram of an engine according to the invention, and wherein FIGURE 2 is a diagram illustrating the operation of the engine.

Referring to FIGURE 1, the combustion chamber housing is represented by the numeral 1. A piston 2 is positioned within the housing for reciprocating motion therein, and forms the lower boundary of combustion chamber 3. A conventional piston rod 4 connects the piston to the crank 5. Two exhaust conduits 6 and 8 and an intake conduit 7 communicate with combustion chamber 3. Exhaust valves 9 and 11 and intake valve 10 are associated with the corresponding exhaust and intake conduits.

Referring to FIGURE 2, two cycles A and B are represented therein. Cycle A begins with the intake of fuel and oxygen-containing gas through intake conduit 7, which communicates with a conventional source of fuel mixture, such as an intake manifold, not shown. During the intake stroke the piston 2 moves downwardly in the combustion chamber housing 1. The piston then reverses direction and moves upwardly during the compression stroke of the cycle A. At or near the upper end of the compression stroke, and preferably somewhat before top dead center is reached, as in conventional operation, a spark is supplied to the fuel mixture by means of spark plug 12. Combustion of fuel mixture then takes place during the power stroke wherein the piston 2 is driven downwardly. The piston then reverses direction and moves upwardly during the exhaust stroke, during which the combustion products are withdrawn through exhaust conduit 6, which communicates with a suitable receiver 13 for the gases.

The cycle B begins with the intake of a fresh supply of fuel mixture through intake conduit 7, while the piston 2 moves downwardly. The piston then moves upwardly during the compression stroke of the cycle B. No spark is supplied to the compressed fuel mixture, and the piston moves downwardly during an expansion stroke. Then, to complete the cycle B, the piston moves upwardly during an exhaust stroke, while the gaseous materials in the combustion chamber are withdrawn through exhaust conduit 8, which communicates with a suitable receiver 14 for the gases. The power provided by combustion in cycle A supplies the motive force for the piston movement in cycle B, thus providing continuous operation of the engine and exhaust of the unignited gases in cycle B.

The following table shows the valve positioning during the various strokes of the two cycles:

|  | Valves | | |
|---|---|---|---|
|  | 9 | 10 | 11 |
| Cycle A: | | | |
| Intake | Closed | Open | Closed. |
| Compression | do | Closed | Do. |
| Power | do | do | Do. |
| Exhaust | Open | do | Do. |
| Cycle B: | | | |
| Intake | Closed | Open | Do. |
| Compression | do | Closed | Do. |
| Expansion | do | do | Do. |
| Exhaust | do | do | Open. |

From the above description, it is seen that cycle A is a conventional four-stroke cycle, with the combustion products being withdrawn through exhaust conduit 6, whereas cycle B is a four-stroke cycle resembling the conventional cycle except that no spark is supplied at the end of the compression stroke, the gaseous materials produced during cycle B being withdrawn through exhaust conduit 8, i.e. separately from the combustion products produced in the conventional cycle A. The gaseous materials removed through exhaust conduit 8 are similar to the products which are obtained, but only as temporary intermediate products, in the conventional cycle by the chemical reactions occurring in the fuel mixture during the compression stroke prior to the spark. Therefore by analysis of these gaseous materials, it is possible to determine the nature of the reactions which occur prior to the spark in a conventional cycle.

It is to be noted that the gaseous products of the cycle B are produced under temperature and other conditions which are very similar to or identical with the conditions prevailing prior to the spark during the conventional cycle. This contributes to the resemblance of the products from the cycle B to the intermediate products obtained prior to the spark in a conventional cycle.

The gaseous products removed through exhaust conduit 8 contain larger amounts of desirable oxidation products such as oxygenated hydrocarbons, relative to the amounts of products of complete or more nearly complete combustion, such as carbon dioxide, carbon monoxide, water, etc., than the gaseous products removed through exhaust conduit 9. Suitable procedures as well known in the art, for recovery of such desirable oxidation products from the exhaust gases, can be employed to obtain purified oxidation products.

In oxidation procedures for producing desired oxygen-containing compounds, the use of organometallic anti-knock additives such as tetraethyl lead is advantageous in some instances in that it permits the obtaining of higher temperatures in the combustion chamber without ignition, thus favoring the formation of desired oxidation products.

Any suitable means can be employed according to the invention for obtaining the proper timing of the spark and of the opening and closing of the respective valves. In the light of the present specification, a person skilled in the art can provide the proper means. Typical means for obtaining proper timing of ignition and valve operation are shown in the drawing. Crankshaft 23 is geared to camshaft 21 by means of gear 27 on shaft 21 and gear 28 on shaft 23, to provide four revolutions of the latter during one revolution of shaft 21. Cam 22 provides a spark prior to the power stroke in cycle A. Cam 24 lifts valve 9 for the exhaust stroke of cycle A. Cam 25 lifts valve 10 for the intake stroke of cycle B and again for the intake stroke of cycle A. Cam 26 lifts valve 11 for the exhaust stroke of cycle B.

In the preceding description, it is contemplated that the cycle B, in which there is no spark, is followed by a conventional cycle A, so that a conventional cycle and a cycle in which there is no spark alternate. However, it may be desirable in some instances to provide two or more conventional cycles followed by only one cycle in which there is no spark, in order that the temperature in the combustion chamber may be maintained at a higher level because of the greater frequency of the ordinary combustion process. The actual manner in which the conventional cycles alternate with the cycle in which there is no spark can vary considerably. Any suitable manner of alternation can be employed, so long as the combustion products which are produced in the conventional cycles are removed separately from the gaseous materials produced in the cycles in which there is no spark.

In the preceding description, two exhaust valves were provided in order to separately remove gaseous products of the respective cycles. Some benefit according to the invention could be obtained with only one exhaust valve, with conveyance of the gaseous products from the respective cycles to different receivers after passing through the same exhaust valve. However such operation is not preferred, since the division of the gaseous products between the respective reservoirs is not as sharp as in the case where separate exhaust valves are provided.

The test engine according to one embodiment of the invention is useful in determining the nature of any pre-ignition reactions which occur in the various materials in the combustion chamber during the compression stroke. Such materials include not only the fuel itself, but also any additives which may be present therein, e.g. tetraethyl lead, etc., and also any nonhydrocarbon impurities in the fuel, and also any volatilized lubricating oil which may have found its way into the combustion chamber.

The test engine according to this embodiment of the invention is also useful in determining the effect on combustion characteristics of residual materials left in the combustion chamber from the preceding cycle. In the operation of the test engine according to the invention the amount of material left in the combustion chamber from one cycle in which there is a spark until the next cycle in which there is a spark is greatly reduced from that obtained in ordinary operation, since a large amount of the residual material which would ordinarily remain in the combustion chamber from one cycle wherein there is a spark until the next is removed during the intervening cycle in which there is no spark. By comparing operation accοrding to the invention with conventional operation it is possible to determine whether the residual materials in conventional operation have a substantial effect on engine performance. If there is a substantial effect, the performance in operation according to the invention will be different for that reason from the performance in conventional operation.

Thus for example a mixture of pure hydrocarbon fuel with tetraethyl lead can be employed on the one hand in conventional operation with a spark in each cycle and on the other in operation as represented by FIG. 2. If the performance in the latter is poorer with regard to knocking characteristics than conventional operation, it can be surmised that the beneficial effect from the lead compound, or its decomposition products, is obtained as a result of lead compounds remaining in the combustion chamber from one cycle to the next. The poorer performance in the operation as represented by FIG. 2 would be attributable to the greater extent of removal of lead compounds from the combustion chamber between one cycle in which there is a spark and the next such cycle. Similar experiments can be performed with fuels containing other anti-knock additives or additives for other purposes, or with fuels containing no additive.

A cycle, for the purpose of the present invention, begins with fuel intake and continues through compression, expansion, exhaust, and other operations if any until the next fuel intake. Any suitable number of strokes per cycle can be employed, though four strokes per cycle (commonly referred to as "four-cycle" operation) are preferred.

The present invention can employ any suitable design of engine block and arrangement of valves and spark plug or plugs. The arrangement shown in the drawing is only schematic and is intended to illustrate the fundamental concept of the engine according to the invention, not an actual design.

This application is a continuation-in-part of copending application Serial No. 455,863, filed September 14, 1954, by the present inventor, and now abandoned.

The invention claimed is:

An internal combustion engine adapted for the production of partial oxidation products suitable for recovery and analysis which comprises a combustion chamber having an intake valve for introduction of fuel and oxygen, a first exhaust valve for removal of combustion products and a second exhaust valve for removal of partial oxidation products, a piston adapted for reciprocating motion in said chamber, combustion product collecting means communicating with said first exhaust valve, partial oxidation product collecting means communicating with said second exhaust valve, and means for operating said piston and chamber in successive cycles comprising intake of gaseous material into the chamber, compression of gaseous material in the chamber, expansion of gaseous material in the chamber and exhaust of gaseous material from the chamber, said latter means comprising means for opening said intake valve in the intake stage of each cycle, means for maintaining both exhaust valves closed during the compression stage in each cycle, means for providing spark ignition in certain fired cycles while omitting spark ignition in certain other, unfired, cycles, means for opening said first exhaust valve in the exhaust stage of each of said fired cycles while maintaining said second exhaust valve closed, and means for opening said second exhaust valve in the exhaust stage of each of said unfired cycles while maintaining said first exhaust valve closed.

References Cited in the file of this patent

UNITED STATES PATENTS

| | | |
|---|---|---|
| Re. 23,150 | Sexton | Sept. 20, 1949 |
| 2,432,168 | Morgan et al. | Dec. 9, 1947 |

OTHER REFERENCES

Article: National Bureau of Standards, Technical News Bulletin, "New Data on Automotive Combustion," vol. 37, August 1953, No. 8.

Article: "Apparatus for Studying Autoignition of Engine Fuels," etc., by Levedahl and Howard, Journal of Research, National Bureau of Standards, vol. 46, No. 4, April 1951, RP No. 2200.

Article: "Pre Combustion Reactions in the Spark Ignition Engine," by Ratailliau et al., S.A.E. Quarterly, Transactions, vol. 4, No. 3.